United States Patent [19]
Damen et al.

[11] Patent Number: 5,737,460
[45] Date of Patent: Apr. 7, 1998

[54] APPLICATIONS OF SOLITONS IN TRANSMISSION SYSTEMS EMPLOYING HIGH LAUNCH POWERS

[75] Inventors: Theodoor Charlouis Damen, Colts Neck; Per Bang Hansen, Bradley Beach, both of N.J.; Herman Anton Haus, Lexington, Mass.; Rogers Hall Stolen, Rumson, N.J.

[73] Assignee: Lucent Technologies Inc., Murray Hill, N.J.

[21] Appl. No.: 580,910

[22] Filed: Dec. 29, 1995

[51] Int. Cl.$^6$ .............................. G02B 6/28; H04B 10/00
[52] U.S. Cl. .............................. 385/24; 385/27; 385/122; 359/161; 359/173; 372/6
[58] Field of Search .............................. 385/24, 27, 39, 385/122, 123; 359/161, 173, 179, 180–188, 156, 160, 340, 341; 372/6, 18

[56] References Cited

U.S. PATENT DOCUMENTS

| | | | |
|---|---|---|---|
| 4,406,516 | 9/1983 | Hasegawa | 385/122 X |
| 4,558,551 | 12/1985 | Hasegawa et al. | 385/39 X |
| 4,918,751 | 4/1990 | Pessot et al. | 455/608 |
| 5,035,481 | 7/1991 | Mollenauer | 385/24 X |
| 5,058,974 | 10/1991 | Mollenauer | 385/27 |
| 5,400,165 | 3/1995 | Gnauck et al. | 385/122 |
| 5,561,553 | 10/1996 | Marcerou et al. | 359/341 |
| 5,574,590 | 11/1996 | Edagawa et al. | 359/179 |
| 5,583,959 | 12/1996 | Nakazawa et al. | 385/27 |
| 5,600,479 | 2/1997 | Evans | 385/16 X |

OTHER PUBLICATIONS

Y. Miyamoto, T. Kataoka, A. Sano, K. Hagimoto, K. Aida, and Y. Kobayashi, "10 Gbit/s, 280 Km nonrepeatered transmission with suppression of modulation instability," Electronics Letters, vol. 30, No. 10, pp. 797–798, May 1994.

A. Sano, Y. Miyamoto, T. Kataoka, H. Kawakami and K. Hagimoto, "10 Gbit/s 300 km repeaterless transmission with SBS suppression by the use of the RZ format", Electronic Letters, vol. 30, No. 20, pp. 1694–1695, Sep. 1994.

Gautheron, "Experimental Investigation of Stimulated Brillouin Scattering and Self-Phase Modulation Effects on Long Distance 2.5 Gbit/s Repeaterless Transmission", pp. 109–112, Eur. Conf. on Opt. Comms. (ECOC) Switz. 1993.

P.B. Hansen, L. Eskildsen et al., "529 km Unrepeated Transmission at 2.488 Gbit/s using Dispersion Compensation Forward Error Correction, and Remote Post–and Pre–Amplifiers Pumped by Diode-pumped Raman Lasers" Electronic Letters, vol. 31, No. 17, Aug. 1995.

P.B. Hansen, L. Eskildsen, S.G. Grubb and et al., "10 Gb/s, 411 Repeaterless Transmission Experiment Employing Dispersion Compensation And Remote Post– And Pre–Amplifiers", ECOC, Brussels, Belgium, Sep., 1995.

*Primary Examiner*—Akm E. Ullah
*Assistant Examiner*—Hemang Sanghavi

[57] ABSTRACT

A method for launching a high-power signal into anomalous-dispersion fiber without suffering excess spectral broadening and waveform distortion. A high-power signal is launched as very short optical solitons, typically with a pulse width of approximately 1 to 10 ps. The pulse width of the solitons will broaden adiabatically (or nearly adiabatically) as they propagate down the anomalous-dispersion fiber as the average power of the soliton decreases. At the same time, the optical spectrum will narrow. After some distance of travel, when the width of the pulses have broadened to a suitable duration and the average power has decreased to a point where penalties from nonlinearities are insignificant, the pulses enter a significantly linear propagation regime with first order dispersion near zero. A dispersion-shifted fiber may be used or any additional dispersion can be compensated at the receiver. Consequently, no further significant broadening of the spectrum occurs when the signal is received at the receiver. Additionally, the initial wide spectrum of the solitons will result in a high stimulated Brillouin scattering (SBS) threshold reducing the need for artificial broadening of the spectrum.

12 Claims, 12 Drawing Sheets

APPLICATIONS OF SOLITONS IN TRANSMISSION SYSTEMS EMPLOYING HIGH LAUNCH POWERS

BACKGROUND OF THE INVENTION

1. Field of the Invention

The invention is directed to optical fiber transmission systems, and in particular, to a high-speed repeaterless optical fiber transmission system launching a high-power signal into an anomalous-dispersion optical fiber as very short solitons.

2. Description of Related Art

It is well known to those skilled in the art that the higher the launch power that can be injected into a repeaterless transmission system, everything else unchanged, the farther an optical signal will propagate and the greater the transmission distance without amplification. However, the maximum launch power of injected optical signals is limited by nonlinear optical effects.

In the absence of nonlinear effects, pulses of electromagnetic radiation transmitted through optical fiber experience attenuation and dispersion, with the later producing temporal broadening of the pulse. If such broadening is sufficiently severe, adjacent pulses can overlap, resulting in loss of signal detectability. In a single-mode fiber, the two principal dispersion mechanisms are material dispersion and waveguide dispersion. Material dispersion implies that the phase velocity of a plane wave travelling in a medium varies with wavelength, and consequently a light pulse will change width as it travels through the medium. The combination of material dispersion and waveguide dispersion is known as chromatic dispersion.

The important nonlinear effects during propagation through the optical fiber are self-phase modulation (SPM), stimulated Brillouin scattering (SBS) and stimulated Raman scattering (SRS). SPM produces spectral broadening; the interplay between SPM and chromatic dispersion at wavelengths shorter than the zero-dispersion wavelength (lambda-zero) spread the pulses in time. At wavelengths longer than lambda-zero, a modulational instability occurs that also increases the spectral width. SBS produces a strong backscattering of the signal and is customarily avoided by increasing the spectral width of the signal. SRS can produce conversion of power to a longer wavelength, a shift to longer wavelength of short optical pulses, or cross talk between channels of a wavelength multiplexed transmission system.

In a typical transmission system which employs very high signal launch powers, spectral broadening due to self-phase modulation is a significant problem. The spectral width increases very rapidly with the launch power. For example, this behavior was reported by Y. Miyamoto, et al. in Electronics Letters, No. 10, pp. 797–798, 1994. Miyamoto showed with a dispersion of −52.3 ps/nm (normal dispersion), the spectral width measured at −20 dB down from the peak had increased to 0.93 nm for a launch power of 20 dBm. In the case of +70.9 ps/nm (anomalous dispersion) the broadening was even more significant, namely 3.32 nm, due to modulational instability. Using return-to-zero (RZ) signal format, maximum launch powers of 24.3 dBm for a data rate of 10 Gb/s through a fiber span of 300 km have been reported. For example, see Samo et al., Electronics Letters, Vol. 30, No. 20, pp. 1694–1695 (1994). The effect of spectral broadening in a transmission system is that dispersion during the broadening process, as well as, following the broadening will induce distortions of the signal and degrade the system performance. This effect was reported by O. Gautheron et al. in Dig. of ECOC, paper TuC4.5, 1993. Furthermore, the large bandwidth restricts the use of narrow-band optical bandpass filters in the receiver which are desirable to obtain a high sensitivity. In many system experiments, a fiber type with lambda-zero much longer than the signal wavelength is employed to prevent the excess broadening from modulational instability combined with SPM in the initial high-power part of the system. For example, see P. B. Hansen, et al., Electronics Letters, No. 17, pp. 1460–1461, 1995.

In ultra-long transmission systems with periodic amplification, the use of optical solitons has been proposed as a means for overcoming the degradation due to the interaction of SPM and chromatic dispersion.

An optical soliton is a pulse of electromagnetic radiation that propagates in a single-mode optical fiber with a characteristic constant shape. A soliton pulse occurs when the broadening effect due to chromatic dispersion is balanced by contraction due to the nonlinear dependence of the index of refraction on the electric field. The existence of solitons in single mode fiber and the possibility of their stationary transmission was predicted by A. Hasegawa and F. Tappert, Applied Physics Letters, Vol. 23(3), pp. 142–144, (1973). The use of solitons in high capacity communication systems has been disclosed in co-assigned U.S. Pat. No. 4,406,516 incorporated by reference.

In a lossless fiber, the soliton will propagate with no change in pulse width or in pulse shape. In a weakly absorbing fiber, the soliton loses energy and broadens temporary. As opposed to an ordinary optical pulse, the soliton maintains its characteristic shape as it broadens and narrows spectrally. The temporal broadening of the weakly-absorbed soliton is much less than the broadening of a non-soliton pulse experiencing the same value of chromatic dispersion.

It has been found that solitons can be amplified nonelectrically without loss of soliton character as disclosed in U.S. Pat. No. 4,558,921 incorporated herein by reference. In addition, soliton fiber transmission systems can be advantageously used as high data rate transmission systems. For example, an intercontinental transmission system using amplification at intermediate points along the signal path has been disclosed in co-assigned U.S. Pat. Nos. 5,035,481 and 5,058,974 incorporated herein by reference.

However, there is a need to increase the maximum launch power of transmission systems to allow data transmission in longer fiber spans before amplification or regeneration.

SUMMARY OF THE INVENTION

An object of the invention is to provide a method that uses a behavior of solitons that a soliton pulse suffering weak absorption will broaden in time and narrow spectrally as it propagates through the fiber to increase the maximum launch power into a fiber and to increase the maximum transmission distance.

An object of the invention is to provide a method and apparatus to increase the maximum launch power into the transmission system by employing a soliton pulse shape that balances dispersion and self-phase modulation (SPM) in the optical fiber.

Another object of the invention is to provide a very wide spectrum of the signal eliminating or alleviate the need to artificially broaden the spectrum of the soliton to avoid stimulated Brillouin scattering.

Still another object of the invention is to eliminate the need for having the fibers span consist of different types of optical fiber, and in particular, dispersion shifted fiber to eliminate penalties from modulation instability.

To accomplish these and other objects, high-power pulses of electromagnetic radiation are coupled into the optical fiber as very short optical solitons with a pulse width in the range of approximately 1 to 10 ps. As the soliton propagates down the optical fiber, the soliton will experience a loss of average power. As the soliton adjusts to the loss of power, the pulse width of the soliton will broaden adiabatically (or nearly adiabatically). After some distance of travel, the pulse widths have broadened to a suitable duration and the average power has decreased such that fiber nonlinearities are insignificant. Dispersion encountered after this point can be fully or partially compensated in the receiver minimizing temporal distortion of the signal hereafter. Alternatively, a dispersion-shifted fiber may be used. Consequently, the soliton can continue to travel through the fiber without any substantial spectral broadening until the signal reaches the receiver. Moreover, the very wide spectral width of the initially short soliton increases the effective threshold for stimulated Brillouin scattering (SBS) and aleviates or eliminates the need to artificially broaden the spectrum.

Using the method describe above, maximum launch powers can be substantially increased in a high-speed, repeaterless transmission system without significantly degrading the sensitivity of the received signal. As a result, the repeaterless transmission distance can be substantially increased.

In addition to the improvement in transmission distance and increase in the maximum launch power, the pulses are launched with a very wide spectral width and aleviates or eliminates the need to artificially broaden the spectrum.

These and other aspects and advantages of this invention are described or apparent from the following detailed description of the preferred embodiments.

BRIEF DESCRIPTION OF THE DRAWINGS

The preferred embodiments are described with reference to the drawings in which.

DETAILED DESCRIPTION OF PREFERRED EMBODIMENTS

Figure 1:
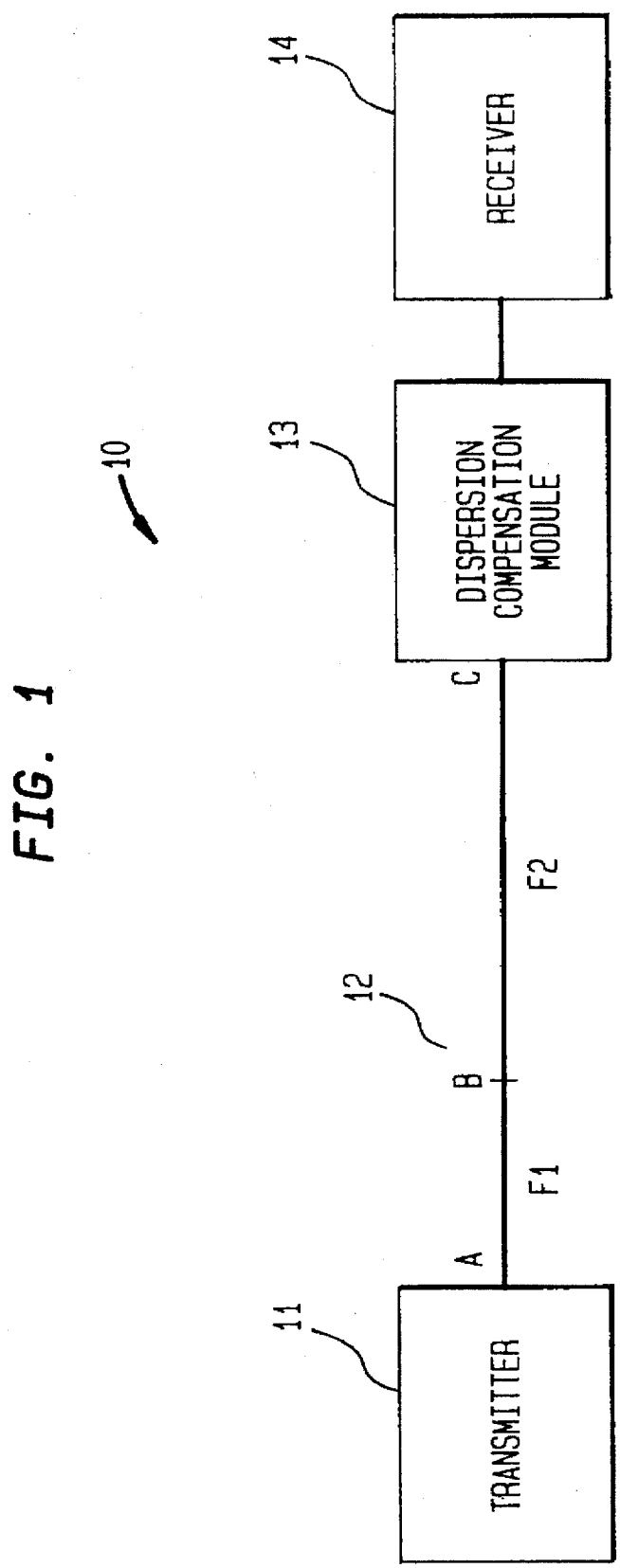
FIG. 1 schmatically shows a preferred embodiment of an apparatus using an application of the principles of the invention.

Ideal soliton propagation involves a continuous balance between dispersion and self-phase modulation as described by the Nonlinear Schrödinger Equation:

$$i\frac{\partial u}{\partial \xi} + \frac{1}{2}\frac{\partial^2 u}{2\partial \tau^2} + |u|^2 u = 0 \tag{1}$$

where u is the normalized amplitude which is a function of $\xi$ and $\tau$, $\xi$ is the normalized coordinate in the direction of propagation, and $\tau$ is the normalized time parameter.

The solution, $u(\xi, \tau)$ to the above equation is a mathematical expression for the ideal soliton which takes on the general form of:

$$u(\xi,\tau) = sech(\tau) \exp(i\xi/2) \tag{2}$$

The pulse width, $\Delta t$ is related to the dispersion, and the nonlinearity of the fiber as well as the peak power of the soliton:

$$\Delta t = \sqrt{\frac{3.11|\beta_2|}{\gamma P_p}} \tag{3}$$

where $\beta_2$ is the fiber dispersion, $\gamma$ is the fiber nonlinearity, and $P_P$ is the peak power.

Assuming that one soliton is transmitted for every logical one in the data sequence and for every logical zero no soliton is transmitted, the peak power, $P_P$, can be expressed by the average power, $P_{avg}$, as:

$$P_p = 1.764 \cdot \frac{T_B}{\Delta t} P_{avg} \tag{4}$$

where $T_B$ is the duration of the bit period and we assume a continuous string of ones.

The pulse width can therefore be written as:

$$\Delta t = 1.764 \frac{|\beta_2|}{\gamma T_B P_{avg}} \tag{5}$$

The soliton length is a convenient measure of length that describes the distance over which the solitons react to changes in power, dispersion, and the like. The soliton length, $z_o$ is defined as:

$$z_o = 0.322 \frac{\pi \Delta t^2}{2|\beta_2|} = 0.322 \cdot \frac{\pi^2 c \Delta t^2}{\lambda^2 D_t} \tag{6}$$

where c is the speed of light, $\lambda$ is the center wavelength of the soliton, $\Delta t$ is the pulse width, and $D_t$ is the group velocity dispersion of the fiber.

It is worth noting that the Nonlinear Schrödinger Equation of Equation (1) does not include loss. In reality, typical applications of solitons in optical systems have included periodic gain compensation for the loss in the fiber. For example, this has been demonstrated both with distributed gain, such as Raman gain, and with lumped amplification, such as conventional Erbium-doped fiber amplifiers. When the distance between points of lumped amplification is smaller that the soliton length, the solitons to first order do not recognize the difference between lumped and distributed amplification.

However, in accordance with the principals of the invention, the soliton will adjust to changes in the characteristic parameters, such as power, as long as the relative change is small over the soliton period. Accordingly, when the relative change in power is small, the soliton will increase in duration and decrease in spectral width as it propagates down a fiber with uncompensated loss. As a result, the product of the temporal and spectral widths, which is typically referred to as the time bandwidth product (TBP), will remain nearly constant. The TBP may fluctuate around the ideal value of 0.315 because of the perturbations in the characteristic parameters and may even increase depending on the magnitude of the perturbations.

Assuming an average power, $P_{ave}$, of 27 dBm, a data rate of 10 Gb/s (bit period duration of 100 ps), a fiber dispersion parameter, $\beta_2$, of approximately $-26$ $ps^2/dBm$ (corresponding to a $D_t$ of approximately 20 ps/nm/km) and a fiber nonlinearity parameter, $\gamma$, of approximately 2 $W^{-1}km^{-1}$, the pulse width of the soliton, $\tau$, is approximately 460 fs with a corresponding spectral width is approximately 680 GHz. Note that an additional benefit of launching a short optical pulse, such as a soliton, is the large spectral width that increases the effective threshold for stimulated Brillouin scattering (SBS) eliminating or aleviating the need for artificially broadening of the signal spectrum.

Using Equation (4), the peak pulse power when the soliton is launched is approximately 190 W. For high peak powers, Stoke's waves generated by stimulated Raman scattering (SRS) separate in time from the signal as the wave propagates down the fiber. Consequently, the time-averaged threshold for the signal is similar to the stimulated Raman scattering threshold for a continuous wave (CW) signal.

Using Equation (6), the soliton length at launching is approximately 4.1 m. Assuming a pulse width desirable for detection of approximately 20 ps, soliton propagation is desirable until the pulse has broadened to 20 ps. Thereafter, linear propagation with a net dispersion near zero is preferable. This can be accomplished by incorporating dispersion compensation in the receiver to offset the dispersion of the transmission fiber after this point. A soliton with a width of 20 ps corresponds to an average power of $$P_{avg}=1.764\beta_2 l/\gamma T_B\Delta t=11.5 \text{ mW} \quad (7)$$

assuming that the fiber parameters for illustration are $\beta_2=-26$ $ps^2/nm$ and $\gamma=2$ $W^{-1}km^{-1}$.

A preferred embodiment 10 of the invention using the principles discussed above is shown in FIG. 1. FIG. 1 shows a transmitter 11, a fiber span 12 consisting of two fiber segments F1 and F2, a dispersion compensation module 13 and a receiver 14. The dispersion compensating module 13 shown in FIG. 1 is a separate unit. However, it may be appreciated that it may also be an integral part of the receiver 14. The locations A, B, and C show the launch point of the soliton, the point where the fiber segments F1 and F2 meet, and the receiving point of the soliton, respectively.

In the preferred embodiment 10 of the invention, 10 Gb/s data-encoded solitons with a width of 460 fs are launched at Point A with an average launch power of approximately 27.0 dBm. The fiber segments F1 and F2 are assumed to be identical with the dispersion parameter, $D_t$, of approximately 20 ps/nm/km and the nonlinearity parameter, $\gamma$, of approximately 2 $W^{-1}km^{-1}$. The solitons have adiabatically broadened to approximately 20 ps at point B when the average power is approximately 11.5 mW (10.6 dBm). The loss of fiber segment F1 at point B is approximately 15.5 dB. Assuming the loss per length of the fiber is approximately 0.175 dB/km, the length of F1 is approximately 88.6 km. Assuming that the required signal level at point C is approximately $-30$ dBm, the loss of fiber segment F2 is approximately 40.6 dB corresponding to a length of approximately 232.0 km. The dispersion in fiber segment F2 is approximately 4640 ps/nm (anomalous dispersion) (232 km multiplied by 20 ps/nm/km). In order to fully compensate for the fiber segment F2, the dispersion compensating module should provide approximately $-4640$ ps/nm dispersion (normal dispersion).

Although the invention can be practiced with any optical fiber in which a soliton can be formed and propagated, typically single-mode, silica-based fiber is used for fiber segments F1 and F2. Although the material dispersion of vitreous silica is zero at about 1.27 μm, silica-based fiber can be designed such that a group velocity dispersion, $D_t$, of zero is as high as 1.65 μm. The group velocity dispersion, $D_t$, is called anomalous at wavelengths longer than the wavelength of zero group velocity dispersion. In addition, such fiber can be designed such that the group velocity dispersion $D_t$, is small over a relatively wide spectral region. For example, silica-based fiber 25 can be designed to have a group velocity dispersion, $D_t$ in the range $0<D_t \leq 2$ ps/nm/km and power loss less than 0.2 dB/km over an approximately 20 nm wide wavelength region. Thus, the carrier wavelength in a high data rate fiber transmission system is usually near the wavelength of net first-order zero chromatic dispersion. Note that dispersion compensation can be employed as a means of changing the wavelength for zero first-order dispersion of the system. However, even at this wavelength, pulse spreading occurs due to higher order terms in the dispersion.

In the preferred embodiment 10 of the invention, the net first-order dispersion of zero in the fiber segment, F2, is realized by employing the dispersion compensating module 13 to allow the entire fiber span 12, F1+F2, to be one type of fiber. Preferably, the type of fiber for the entire fiber span 12 is silica-core fiber because of the low loss per fiber length. Alternatively, the fiber segment F2 may consist of a dispersion shifted fiber with a dispersion at the signal wavelength near zero.

Up to now, an assumption is made that the soliton does not lose any power due to noise, higher order dispersion terms, and the like, i.e., the soliton adjusts its width adiabatically as it propagates in the optical fiber. It should be understood that to eliminate any unwanted spectral components, a bandpass filter (not shown), for example, can be incorporated in the above preferred embodiment 10 of the invention.

A number of transmission tests were conducted to prove the feasibility of the principles of the method and the preferred embodiment of the invention discussed above.

Figure 2:
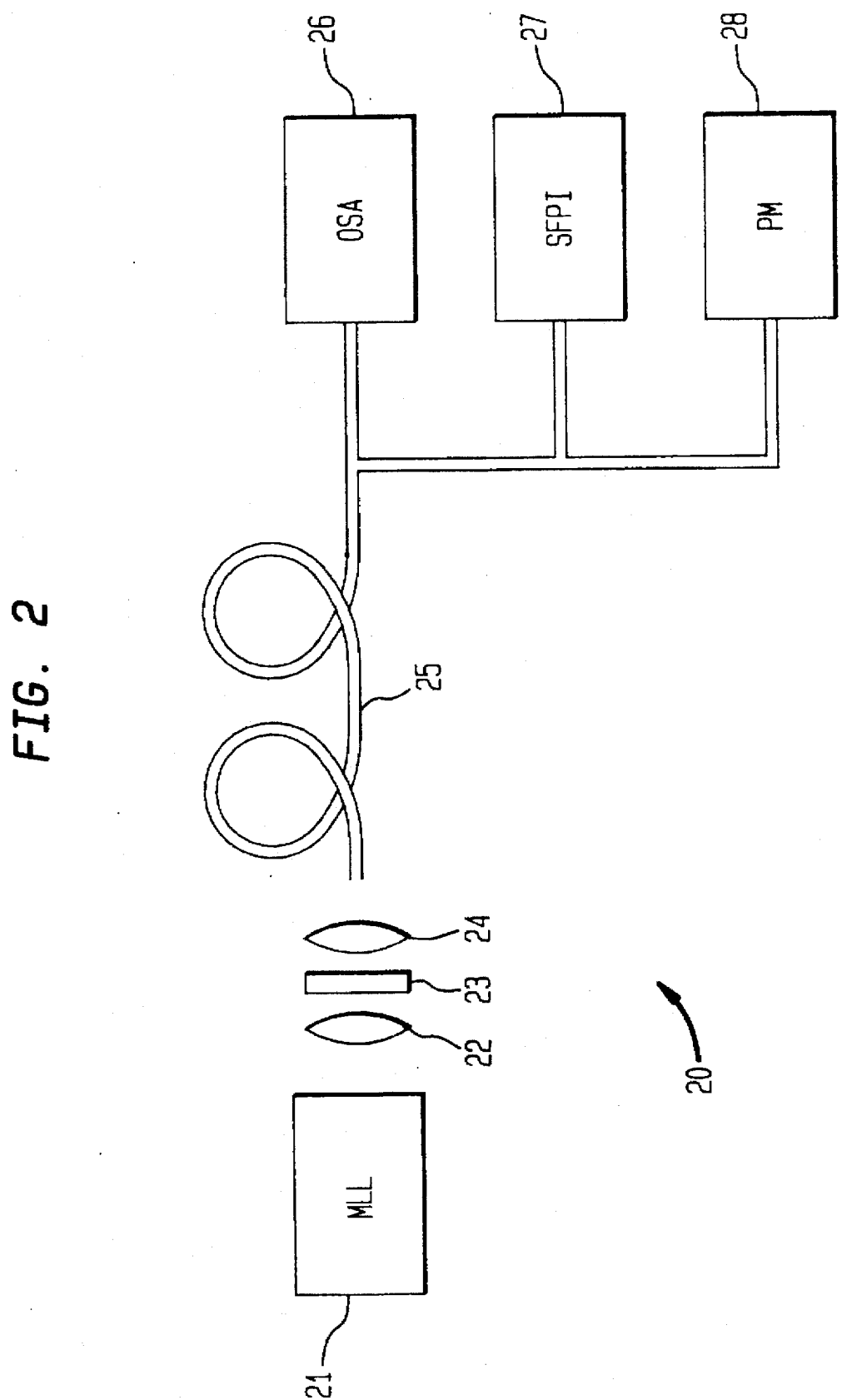
FIG. 2 schematically shows a first experimental test apparatus according to the invention.

Using the apparatus illustrated in FIG. 2 in accordance with the principles of the invention described above, pulses of electromagnetic energy are emitted by pulse generating means, typically a mode-locked laser (MLL) 21, pass through a coupling means, typically lenses 22, 24, into optical fiber 25. A filter means, typically an interference filter 23, may also be used to filter the pulses from MLL 21. Any possible source of pulsed, coherent electromagnetic radiation of the appropriate wavelength and intensity is contemplated to be within the scope of the invention. For example, such a source could also be an appropriate semiconductor laser, a gas laser or the like. Means for coupling the pulsed radiation into the fiber are also well known in the art and will not be discussed herein.

Since any fiber attenuates pulses propagating therethrough, pulses propagating through optical fiber are lower in amplitude than they were when coupled into the input end of the optical fiber. To characterize the pulse, detector or receiver means may comprise, for example, an Optical Spectrum Analyzer (OSA) 26 and a Scanning Fabry-Perot Interferometer (SFPI) 27. Means for receiving and detecting the signal pulses for characterization, as well as, for communication purposes are well known to those in the art and do not require further discussion here.

To prove the feasibility of the principles of the invention, a mode-locked laser 21 launches a pulse train of solitons at a repetition rate of 80 MHz. The pulses pass through lens 22, 24, and a 5-nm interference filter 23. The 500 fs wide pulses were launched into a 71 km long span of silica-core fiber 25. The output power of the soliton may be measured using power meter (PM) 18. The power loss of the 71 km fiber span is approximately 13.0 dB. Measurements of the spectrum were performed using OSA 26 with a resolution of 0.05 nm and SFPI 26 with a free-spectral range of 612 GHz and a bandwidth of 2.5 GHZ at launch powers of 6 dBm, 7 dBm and 8 dBm. The pulse width of the solitons is measured using autocorrelation.

Figure 3A:
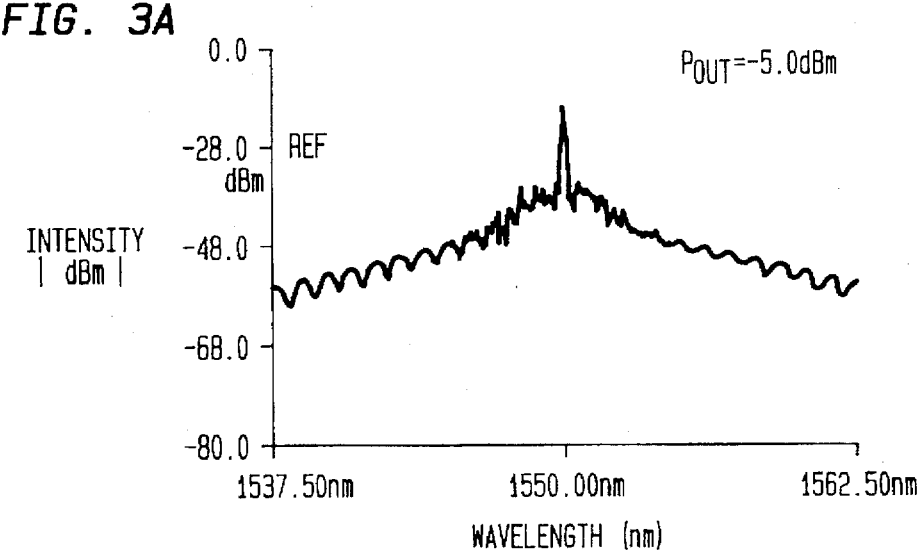
FIGS. 3A–3I shown measurements of the spectrum of the soliton at average output powers between 5–0 dBm to –20.0 dBm using the Optical Spectrum Analyzer (OSA) of FIG. 2.
Figure 3B:
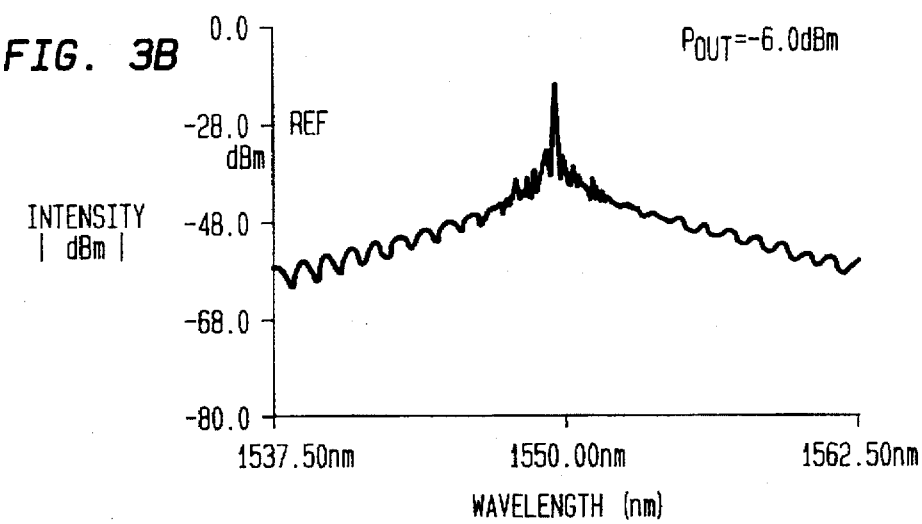
Figure 3C:
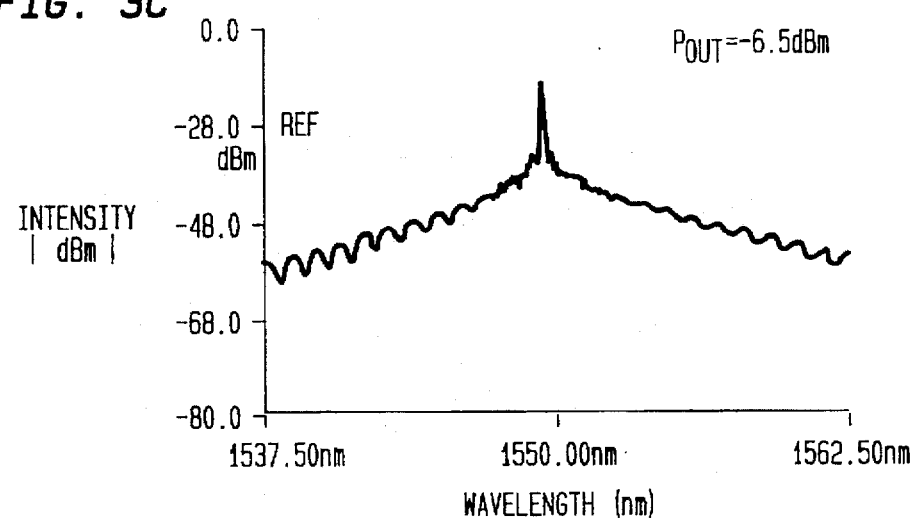
Figure 3D:
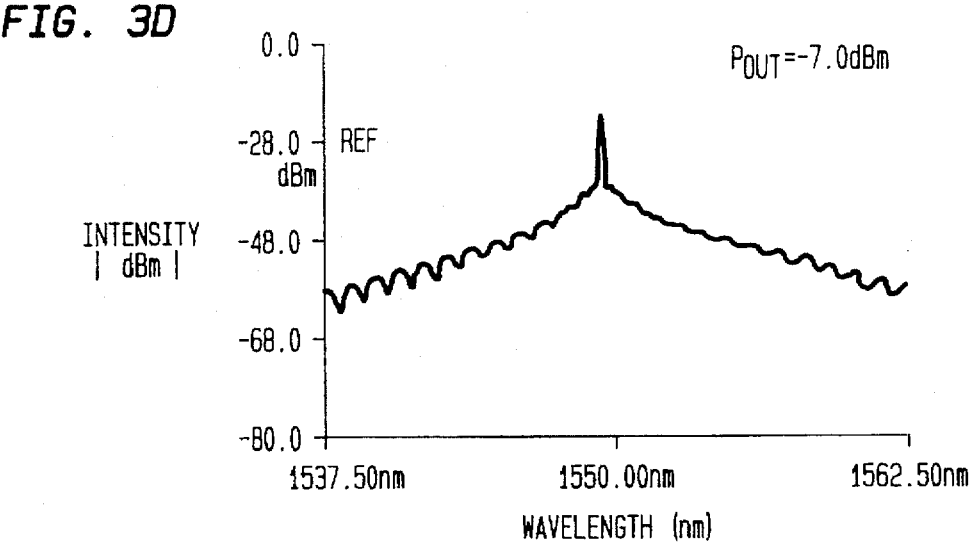
Figure 3E:
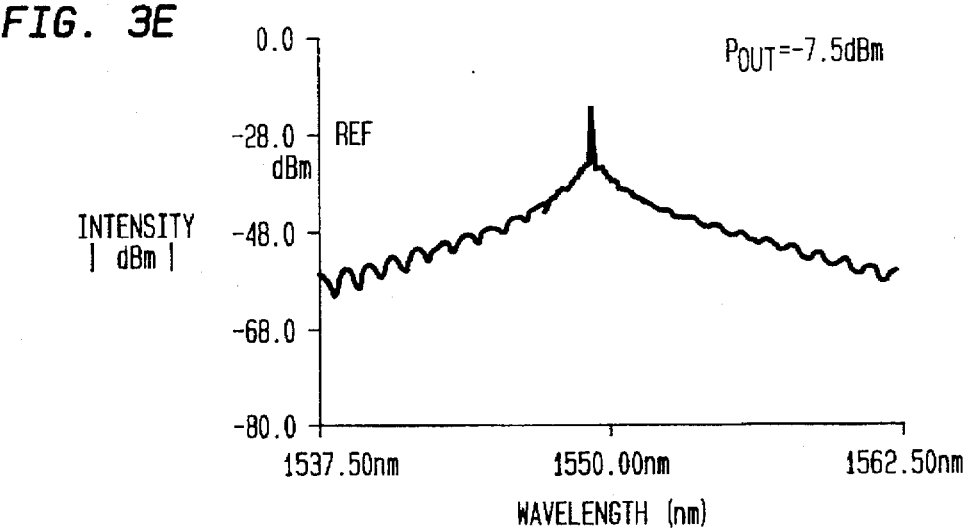
Figure 3F:
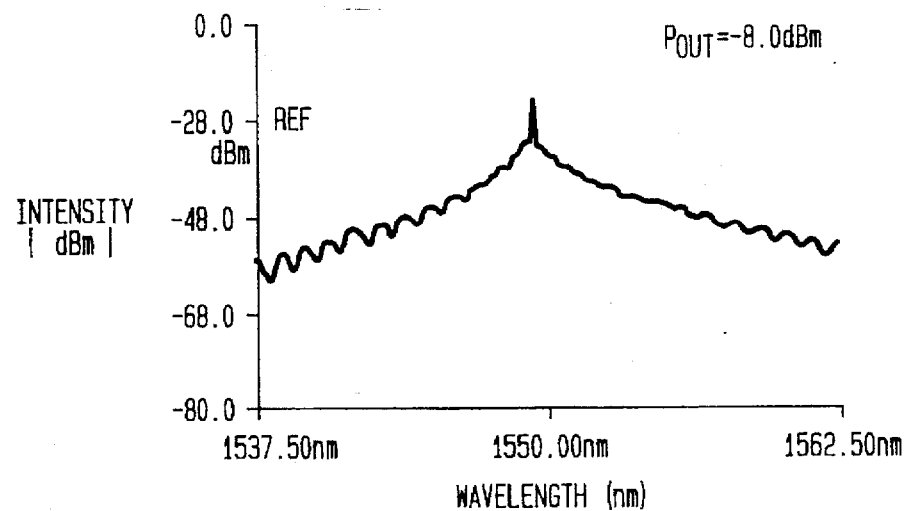
Figure 3G:
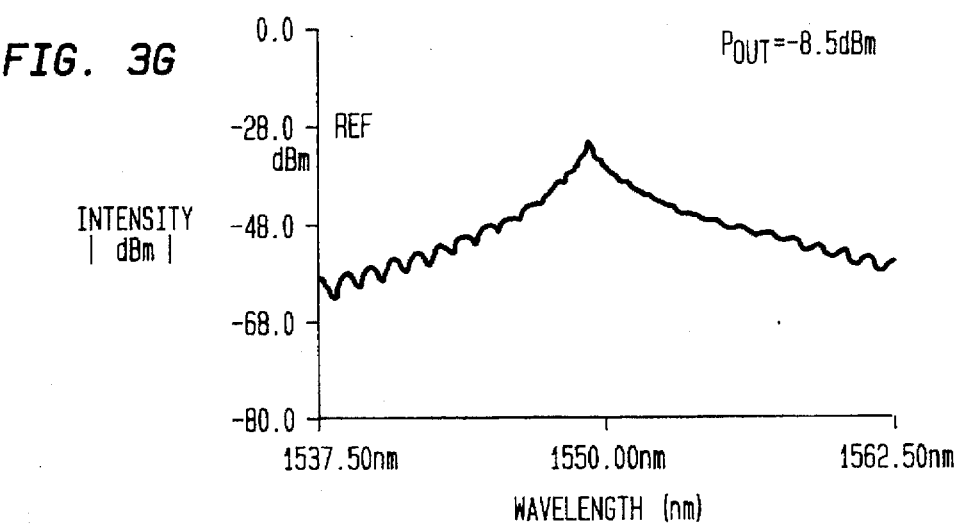
Figure 3H:
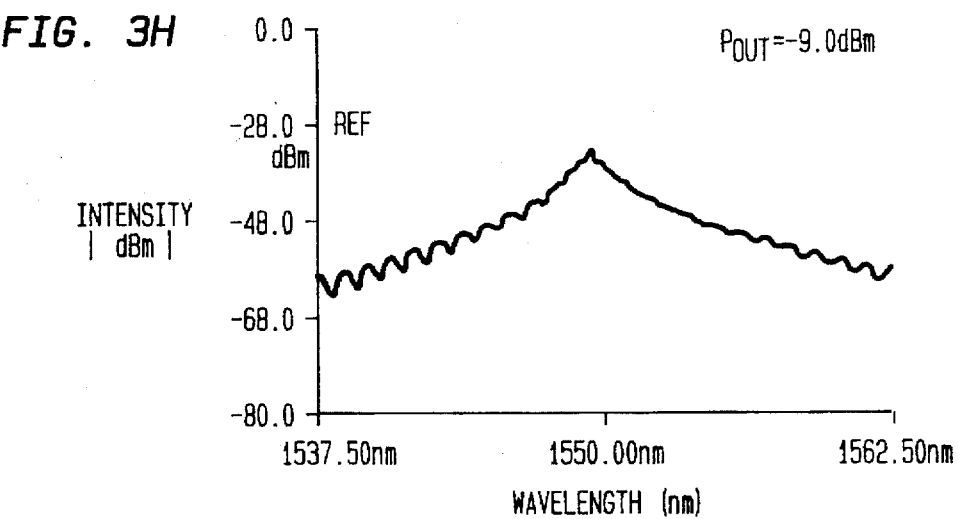
Figure 3I:
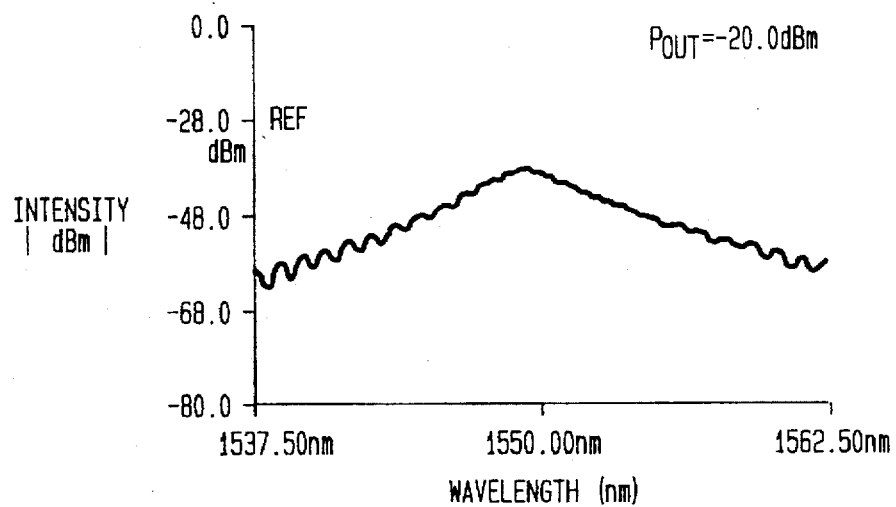

FIGS. 3A–3I show measurements of the spectrum of the soliton using the OSA 26. FIGS. 3A–3H show the spectrum of the soliton at average output powers in the range of approximately −5.0 dBm to −9.0 dBm, respectively. At average output powers in the range between approximately −5.0 dBm and −7.0 dBm, some fluctuations in the spectrum near the peak power are observed. These fluctuation are caused by a Raman shift because the center wavelength of the spectrum varies as a function of power (increasing wavelength with increasing power). At an average output power below approximately −7.0 dBm, the peak decreases with decreasing power. The narrow peak indicates that a broadening of the pulse width occurs because the power decreasing along the fiber is accompanied by a narrowing of the spectrum. The most stable soliton propagation regime appears to be around an output power, $P_{out}$, of approximately −7.0 dBm. FIG. 3I shows the spectrum of the pulse at the time of launching corresponding to an output power level of approximately −20.0 dBm in which fiber nonlinearities are insignificant and the spectrum does not change.

Figure 4A:
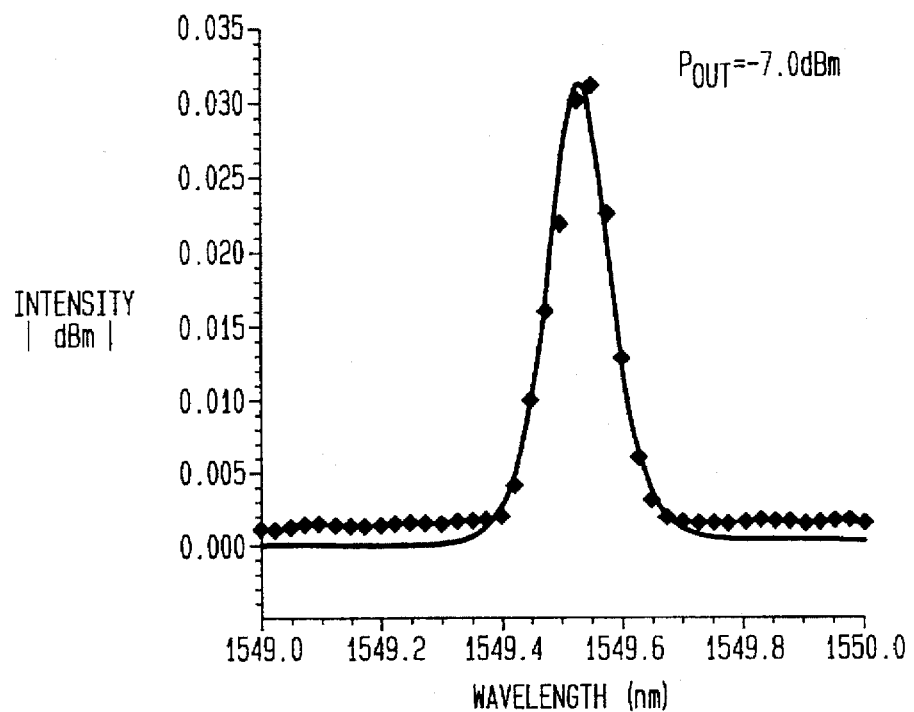
FIGS. 4A and 4B show the spectrum of the soliton at an output power of –7.0 dBm using the OSA at a higher resolution than FIGS. 3A–3I.
Figure 4B:
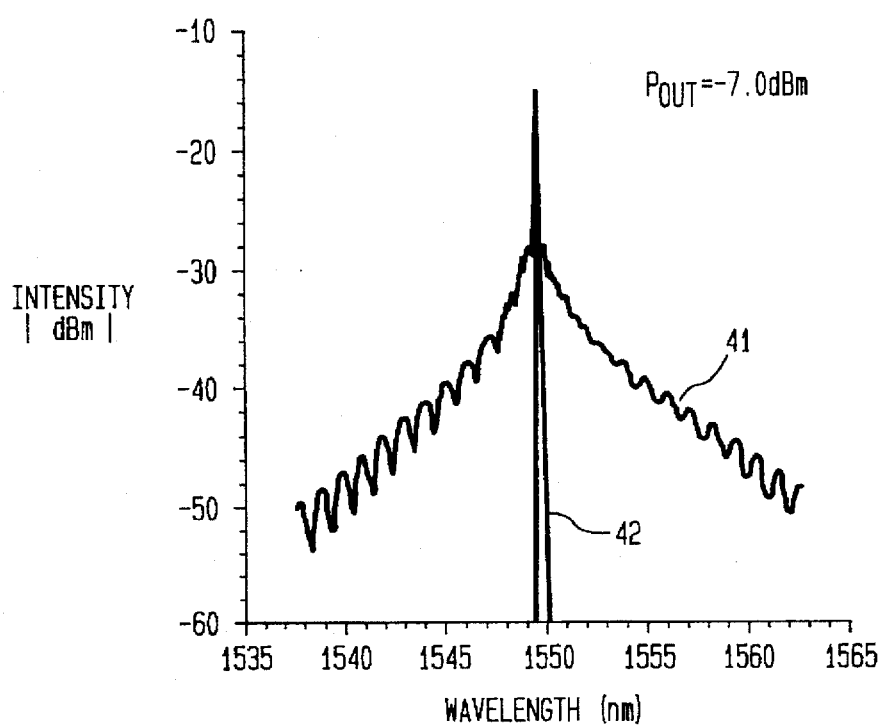

FIGS. 4A and 4B show the spectrum of the soliton at an output power of −7.0 dBm using OSA 26. In FIG. 4A, the diamonds represents the measured spectrum and the solid line represents a fitted, background-free $sech^2$-shaped spectrum (ideal soliton spectrum). As seen in FIG. 4A, good agreement exists between the measured spectrum of the soliton and the ideal soliton spectrum. In FIG. 4A, the width of the soliton pulse is measured to be approximately 1.17 Å (i.e. 14.6 GHz). After deconvolving with 0.05 nm, the width of the soliton pulse is measured to be approximately 13.2 GHZ. Similar measurements at average output powers, $P_{out}$, of −6.0 and −5.0 dBm yielded a pulse width after deconvolution of 11.1 GHz and 13.8 GHZ, respectively.

FIG. 4B shows the measured spectrum 41 and a fit using the method of least squares to a background-free, $sech^2$ spectrum 42 (ideal soliton spectrum) over a larger frequency span than in FIG. 4A. In comparing the measured spectrum 41 with the fit 42, the results indicate that some power of the pulse is not in the soliton. From comparing the measured spectrum 41 and the ideal soliton spectrum 42, the results indicate that approximately 50% of the power of the pulse is in the soliton.

Figure 5A:
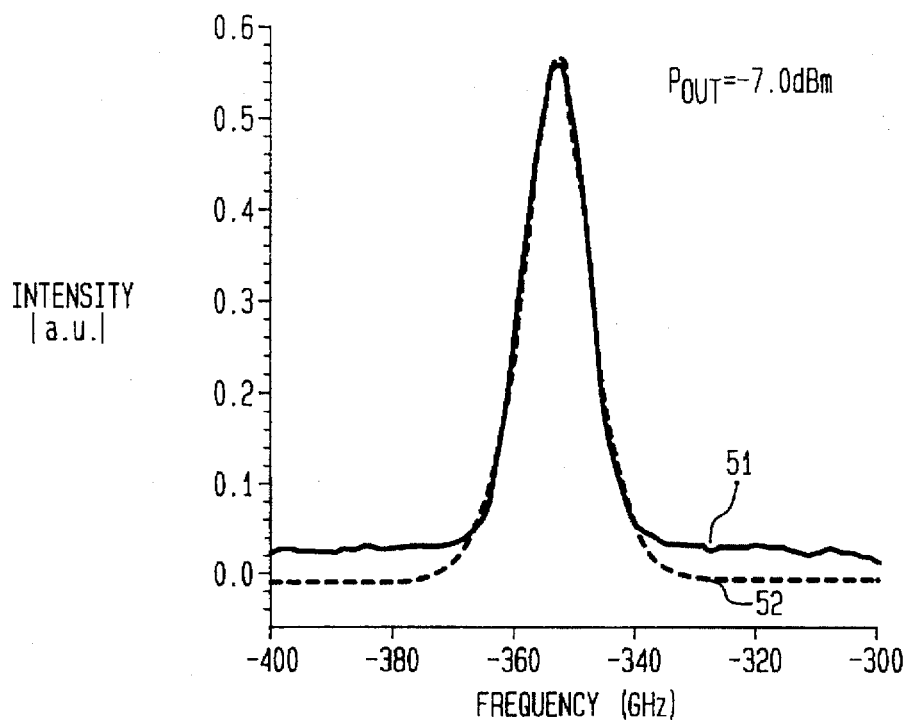
FIGS. 5A and 5B show the spectrum of the soliton measured at an output power of –7.0 dBm using the Scanning Fabry-Perot Interferometer (SFPI) of FIG. 2.
Figure 5B:
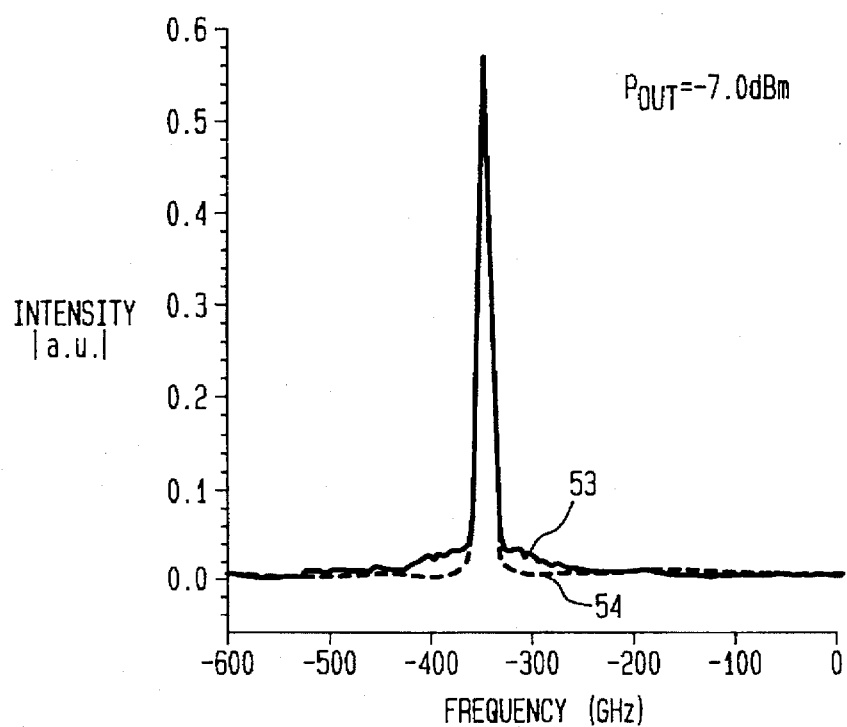

FIGS. 5A and 5B show the spectrum of the soliton measured using SFPI 27 at an output power of −7.0 dBm. In FIG. 5A, the measured spectrum of the soliton is represented by the solid line 51 and the background-free, $sech^2$-shaped ideal soliton spectrum is represented by the dashed line 52. As seen from FIG. 5A, the measured spectrum 51 with a pulse width of approximately 12.8 GHz at full width at half maximum (FWHM) agrees very well with the ideal soliton spectrum 52. Similar measurements at output powers of −6.0 dBm and −5.0 dBm yielded a pulse width of 14.0 GHz and 12.0 GHz, respectively.

FIG. 5B shows the measured spectrum 53 and a fit using the method of least squares to a $sech^2$-shaped spectrum 54 (ideal soliton spectrum) over a larger frequency span than in FIG. 5A. When fitted to an ideal soliton spectrum 54 offset by 0.0106, the results indicate that approximately 78% of the pulse power is in the soliton. From comparing the measured spectrum 53 to the ideal, background-free soliton spectrum, the results indicate that approximately 59% of the pulse power is in the soliton.

Figure 6:
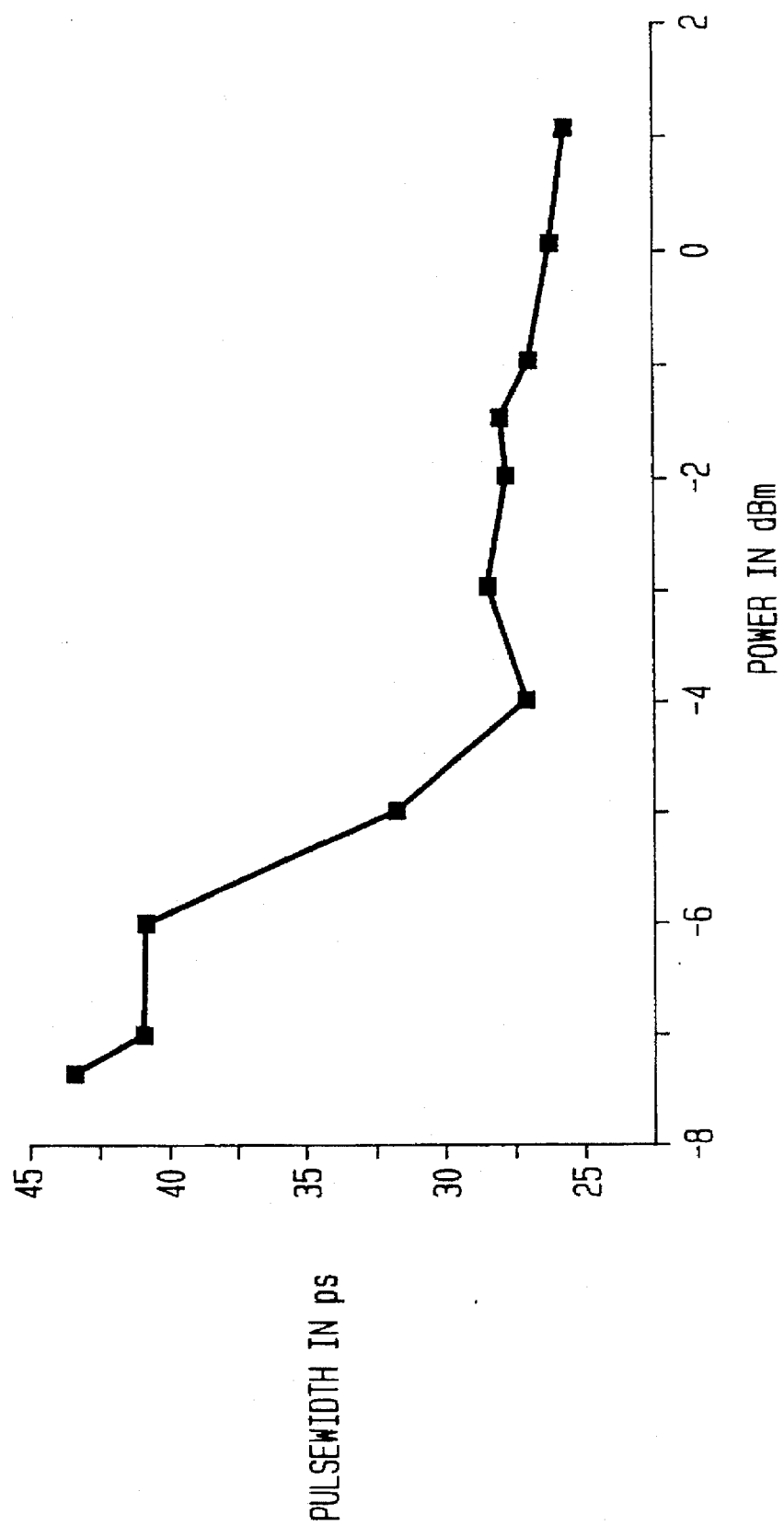
FIG. 6 shows the measured pulse width at output powers of approximately –7.0 dBm, –6.0 dBm and –5.0 dBm using the apparatus of FIG. 2.

FIG. 6 shows the measured pulse width as a function of measured average output power of the pulse. The pulse widths were computed as the measured full width at half-maximum (FWHM) of the autocorrelation multiplied by 0.64, i.e. a $sech^2$ pulse shape (ideal soliton) is assumed. At average output powers of approximately −7.0, −6.0 and −5.0 dBm, the width is measured to be approximately 42, 42 and 33 ps, respectively.

The time bandwidth product (TBP) gives an indication of the quality of the soliton when propagating through optical fiber. At average output powers of approximately −7.0, −6.0 and −5.0 dBm, the TBP is measured to be approximately 0.53, 0.51 and 0.41, respectively. When compared to an ideal soliton TBP of 0.315, the results indicate that the TBP of the measured pulse agrees quite well with the TBP of an ideal soliton.

Figure 7A:
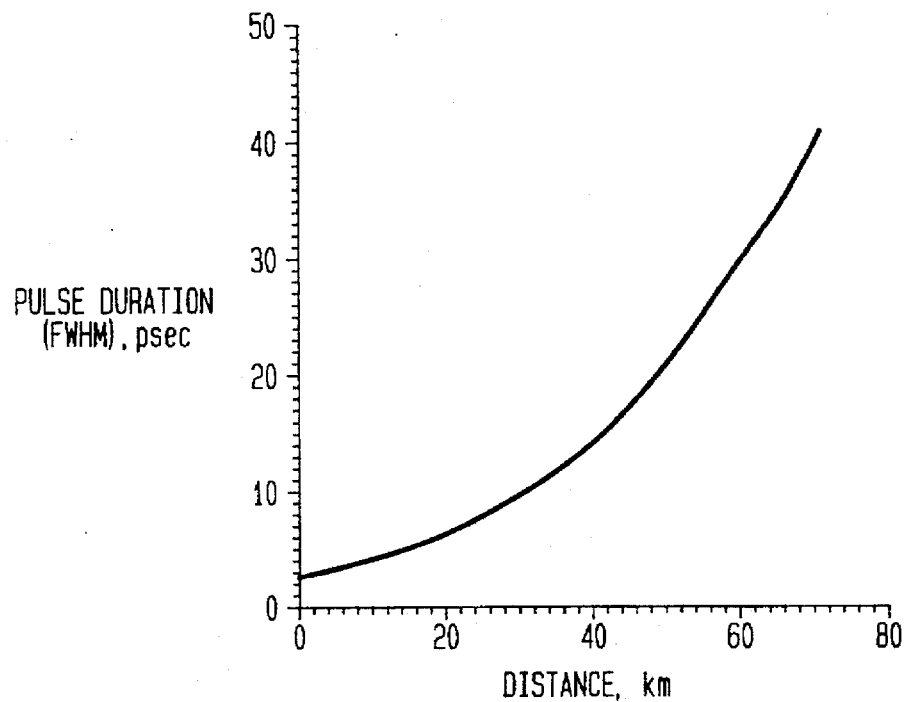
FIGS. 7A–C show the calculated pulse width, time-bandwidth product and normalized pulse area as a function of transmission distance.
Figure 7B:
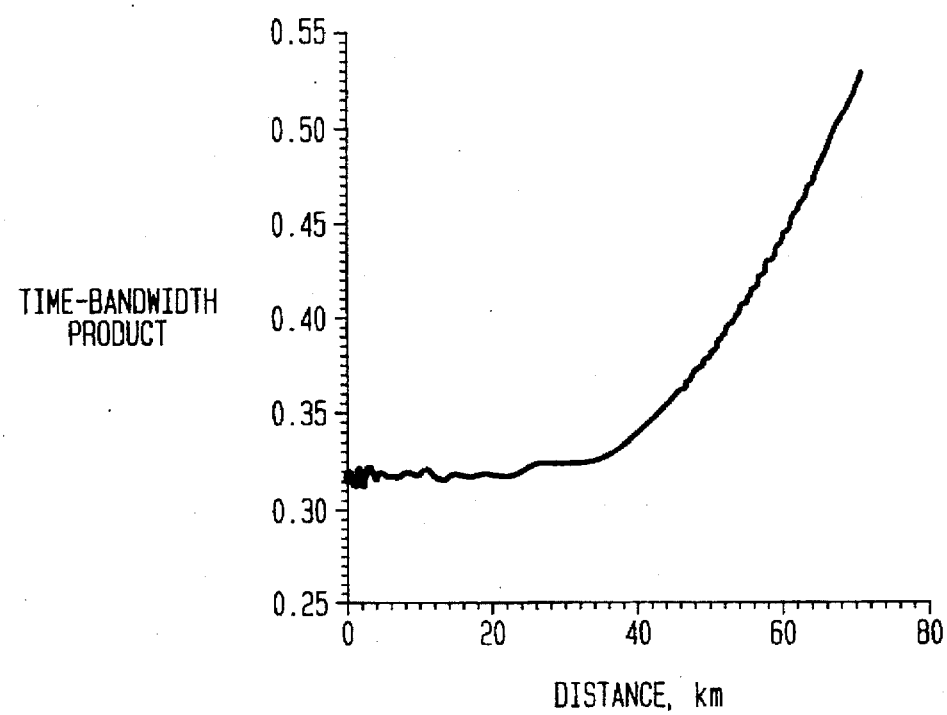
Figure 7C:
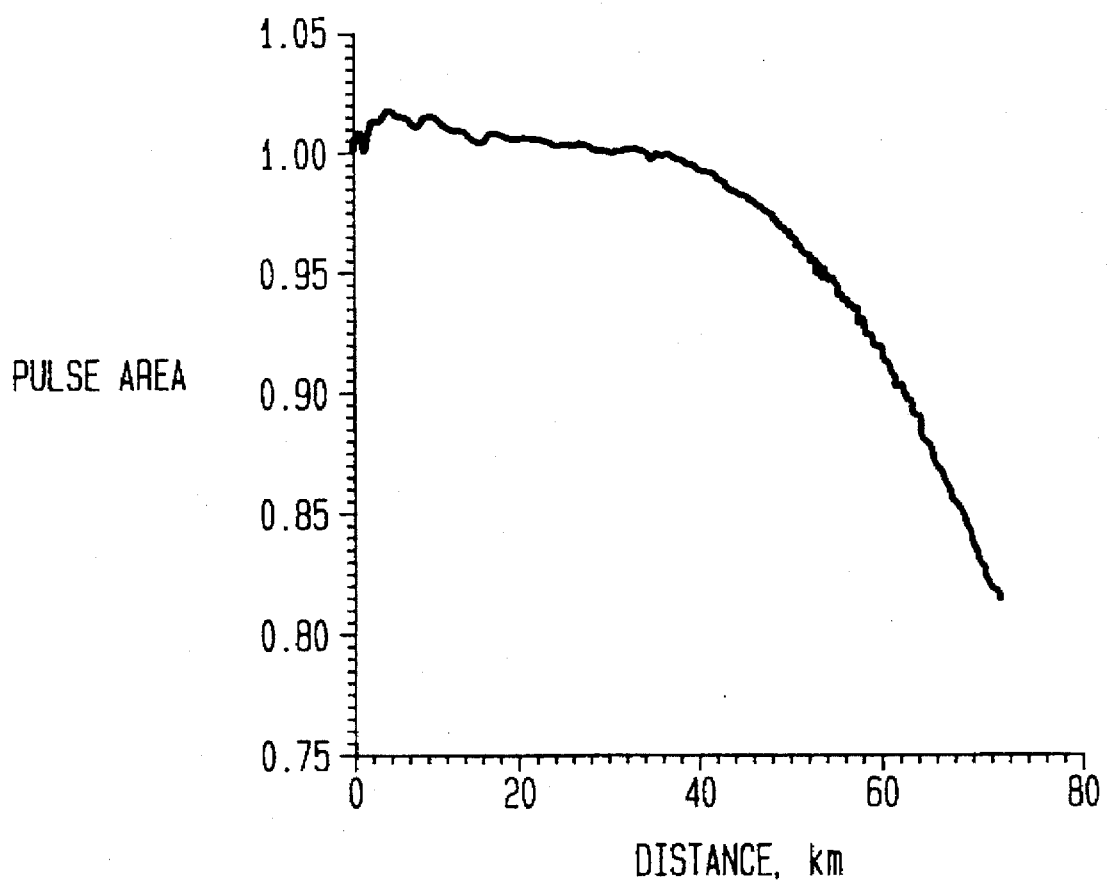

FIGS. 7A–C show numerical calculations of pulse width, time-bandwidth product and normalized pulse area as a function of transmission distance, respectively. The calculations assume that the soliton is launched at an average power of approximately 6.0 dBm at a 80 MHz repetition rate. Numerical calculations based on the Nonlinear Schrödinger Equation show that the launched pulses with a width of 500 fs and an average launch power of approximately 6.0 dBm transform into solitons with a background that contains approximately 25% of the power.

Referring now to FIG. 7A, after the soliton has travelled a distance of 71 km, the calculated pulse width increases to approximately 41 ps. Because of the 13.0 dB loss in the 71 km fiber span, a launch power of +6.0 dBm corresponds to an average output power of −7.0 dBm. At the average output power of −7.0 dBm, the measured pulse width of approximately 41 ps indicates perfect agreement with the calculated pulse width shown in FIG. 7A.

Referring now to FIG. 7B, the time-bandwidth product deviates only little from that of an ideal soliton (i.e. 0.315) during the first 20–30 km of travel distance because the loss per soliton length is relatively small and the pulse width of the soliton adjusts itself accordingly. Thereafter, the loss per soliton length becomes significant as the pulse width broadens and the length of the soliton increases. As a result, the time-bandwidth product increases. At a travel distance of 71 km the TBP has increased to approximately 0.51. In FIG. 6, the measured time-bandwidth product at a travel distance of 71 km is approximately 0.53. Thus, good agreement exists between the calculated TBP and the measured TBP. It should be understood that any excessive broadening of the pulse width and consequent increase in the TBP may be ameliorated by providing dispersion shifted fiber or by dispersion compensation at the receiver.

A summary of results proving the feasibility of the principles of the invention are listed in Table I. The spectral widths in Table I are the average of the measured spectral widths using OSA 26 and SFPI 27. In general, the time-bandwidth product as a function of launch power indicates a good agreement with theoretical predictions.

TABLE I

| Launch Power | Pulse width | Spectral width | Time-bandw, product |
|---|---|---|---|
| 6.0 dBm | 41 ps | 13.00 GHz | 0.53 |
| 7.0 dBm | 41 ps | 12.55 GHz | 0.51 |
| 8.0 dBm | 32 ps | 12.90 GHz | 0.41 |

Figure 8:
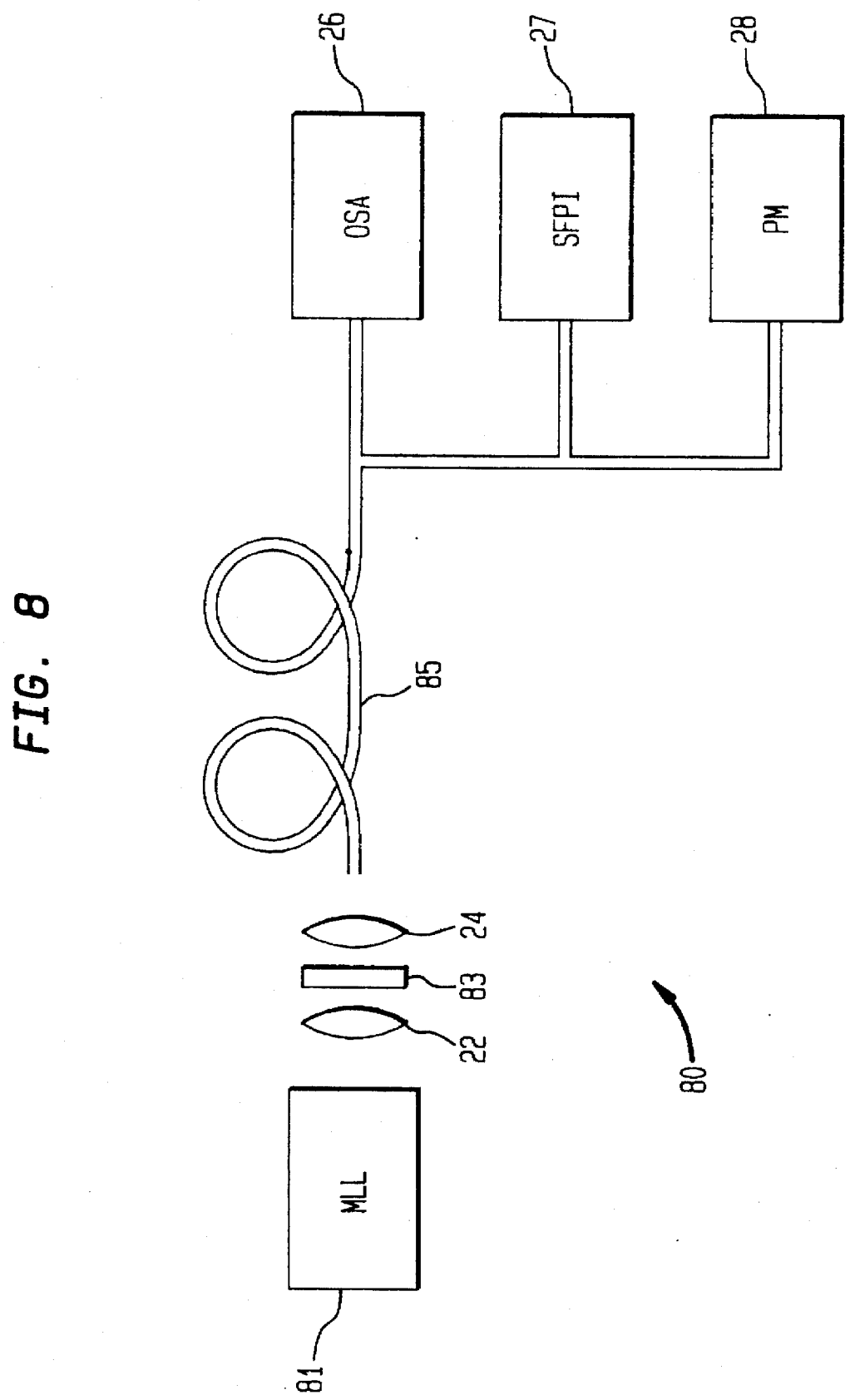
FIG. 8 schematically shows a second experimental test apparatus according to the invention.

FIG. 8 shows a second apparatus 80 to prove the feasibility of the principles of the invention in a second transmission test. As seen in FIG. 8, the apparatus 80 is identical to the first apparatus 20 shown in FIG. 2, with the exception that the mode-locked laser 81 launches a pulse train of 2.7 ps solitons at a repetition rate of 80 MHz into a 8.3 km long span of silica-core fiber 85. The pulse train was generated by filtering the 130 fs pulse train generated by the mode-locked laser with a 1-nm interference filter 83. Similar to the first apparatus 20, the spectrum of the soliton is measured at launch powers of 6 dBm, 7 dBm and 8 dBm using OSA 26 with a resolution of 0.05 nm and SFPI 27 with a free-spectral range of 612 GHz and a bandwidth of 2.5 GHZ. The pulse widths were measured using autocorrelation. Because the loss per soliton length is rather small throughout the 8.3 km fiber span, the time-bandwidth product is expected to be constant.

Figure 9A:
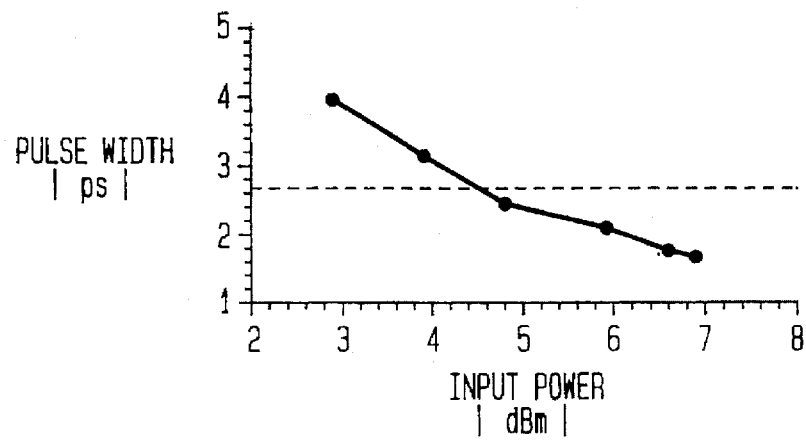
FIGS. 9A–C show the measured pulse width at input powers in the range of approximately 3.0 to 7.0 dBm using the apparatus of FIG. 8.
Figure 9B:
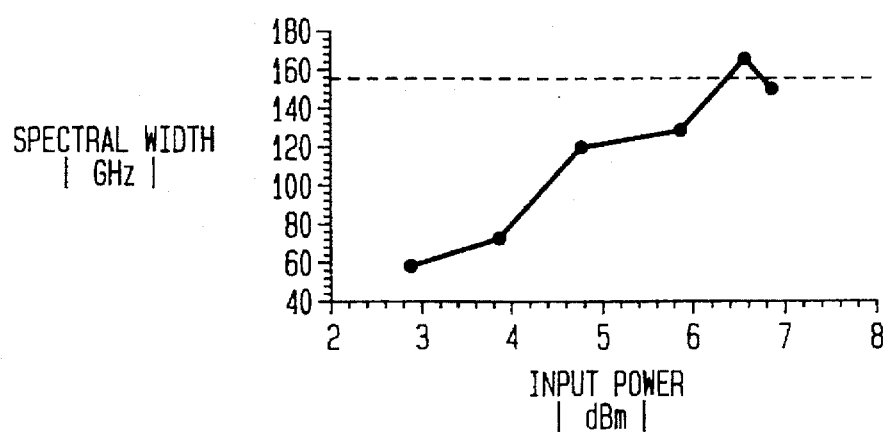
Figure 9C:
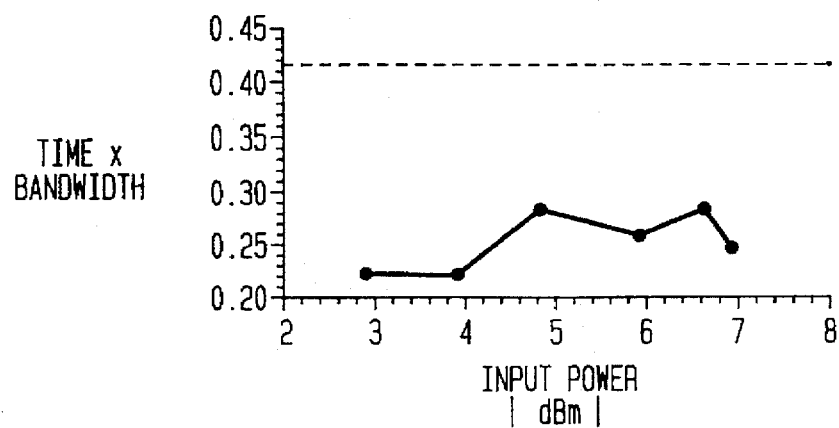

FIGS. 9A–C show the measured pulse width at input powers ranging from approximately +3.0 dBm to +7.0 dBm using the apparatus shown in FIG. 8. The dotted line represents the measured characteristics of the launched pulse, i.e., pulse width of 2.7 ps, spectral width of 155 GHz and a TBP of 0.42. In FIG. 9A, it is clearly seen that the pulse is inversely proportional to the launch power when considering measurement uncertainties. Thus, the pulse width decreases by a factor of two from 4 ps to 2 ps when the launch power increases by a factor of two from 3 dBm to 6 dBm. In FIG. 9B, it is clearly seen that the spectral width is proportional to the launch power when considering measurement uncertainties. As expected, the time-bandwidth product, shown in FIG. 9C, is almost constant as a function of launch power indicating good agreement with an ideal soliton (0.315) given the experimental uncertainties.

In summary, solitons rely on the interplay between dispersion and self-phase modulation. When the fiber dispersion and nonlinearity are known, the pulse width is inversely proportional to the peak power (or average power) for a given data rate. In order to launch a high average power signal, the signal is launched as a pulse train of short solitons—typically with durations between 1 and 10 ps. An additional benefit occurs because the initial wide spectrum of the short solitons will result in a high SBS threshold alleviating the requirement of artificial broadening of the spectrum. As the soliton propagates down the fiber, the soliton experiences loss of average power. For a relatively small loss of average power of the soliton with respect to the length of the soliton, the pulse width of the soliton will adjust according to the peak power of the soliton. In fact, the soliton length is proportional to the square of the soliton pulse width and typically varies from a few meters at launching to hundreds of kilometers while propagating through the fiber. After some propagation distance, the average power of the soliton has decreased and the signal enters a significantly linear propagation regime with zero net dispersion. This can be accomplished, for example, by changing the fiber type in the last section of fiber to a dispersion shifted fiber or compensating for the any additional dispersion at the receiver.

The average power level for a 80 MHz pulse train can be scaled to a 10 Gb/s data encoded signal with a marker ratio of 50%. The average launch power can be 10·log (10000/80)–3 dB, or 18.0 dB higher. Consequently, it is estimated that a 10 Gb/s signal with an average power level [of at least 30 dBm] can be launched into silica-core fiber replacing the conventionally used NRZ signal with a signal consisting of 3 ps wide solitons without significantly degrading receiver sensitivity. Furthermore, solitons with shorter durations may be used for higher average launch powers. In fact, using the above described method, the only limitations on the maximum possible launch power are the effects due to fiber nonlinearities, such as Raman shifting, or the like.

While the invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

We claim:

1. A method for launching a sequence of optical pulses into a transmission system, comprising the steps of:

generating a sequence of pulses of electromagnetic radiation of a given wavelength;

launching the sequence of pulses into a first optical fiber span at an input location, the sequence of pulses forming fundamental solitons having a pulse width at the input location;

propagating the solitons a distance through a first optical fiber span without amplification until the pulse width of the solitons adiabatically broadens and an average power of the solitons decreases such that self-phase modulation in the first optical fiber span becomes insignificant;

propagating the solitons through a second optical fiber span without amplification to an output location; and detecting the solitons at the output location.

2. The method according to claim 1, further comprising compensating for dispersion of each pulse while each pulse propagates through the second optical fiber span.

3. The method according to claim 2, wherein the dispersion of each pulse while propagating through the second optical fiber span is compensated by a dispersion compensation module.

4. The method according to claim 3, wherein the dispersion compensation module is disposed within a receiver.

5. The method according to claim 1, wherein the first optical fiber span and the second optical fiber span comprise an identical type of optical fiber.

6. An optical fiber transmission system, comprising:

a transmitter for generating a sequence of pulses of electromagnetic radiation;

a first optical fiber span having an input location, the sequence of pulses forming fundamental solitons having a pulse width at the input location;

a second optical fiber span having an output location; and a receiver for receiving the solitons at the output location, wherein the solitons propagate a distance through the first optical fiber span without amplification until the pulse width of the solitons adiabatically broadens and an average power of the solitons decreases, and wherein the solitons then propagate through the second optical fiber span without amplification to the output location.

7. The transmission system according to claim 6, further comprising a dispersion compensation module to compensate for dispersion of the solitons while propagating through the second optical fiber span.

8. The transmission system according to claim 7, wherein the dispersion compensation module is disposed within the receiver.

9. The transmission system according to claim 6, wherein the first optical fiber span and the second optical fiber span comprise an identical type of optical fiber.

10. The transmission system according to claim 9, wherein the identical type of optical fiber comprises a single mode optical fiber.

11. A method for increasing a maximum launch power of a sequence of pulses of electromagnetic radiation, comprising the steps of:

generating the sequence of optical pulses of electromagnetic radiation of a given wavelength;

launching the sequence of pulses into an optical fiber at an input location, the optical fiber having anomalous group velocity dispersion in a spectral region that includes the given wavelength, the sequence of pulses forming fundamental solitons in the optical fiber; and allowing the solitons to propagate a distance through the optical fiber without amplification while a decrease in an average power of the solitons creates a balance between narrowing of the spectral region due to self-phase modulation and broadening of the spectral region due to anomalous group velocity dispersion, thereby increasing the maximum launch power of the sequence of pulses of electromagnetic radiation.

12. The method according to claim 11, wherein the sequence of optical pulses are launched with a spectrum resulting in a high stimulated Brillouin scattering threshold thereby reducing the need for artificial broadening of the spectrum.

* * * * *